United States Patent [19]

Matsumoto et al.

[11] Patent Number: 4,464,594

[45] Date of Patent: Aug. 7, 1984

[54] VEHICULAR GENERATOR WITH COOLING FAN MADE OF RUBBER COVERED SHAPE MEMORIZING ALLOY

[75] Inventors: Akio Matsumoto, Kanzaki; Mitsuharu Morishita, Himeji; Mitsuyoshi Yokota, Ibo; Shinichi Kouge, Himeji, all of Japan

[73] Assignee: Mitsubishi Denki Kabushiki Kaisha, Tokyo, Japan

[21] Appl. No.: 487,702

[22] Filed: Apr. 21, 1983

[30] Foreign Application Priority Data

Apr. 28, 1982 [JP] Japan .............................. 57-64564[U]

[51] Int. Cl.³ .............................................. H02K 9/00
[52] U.S. Cl. ........................................ 310/63; 310/51; 310/52; 310/60 R
[58] Field of Search ........................ 310/51, 62, 63, 61, 310/60 R, 60 A, 67 R, 52–59, 64; 415/12, 47, 48; 416/142, 145, 223 R; 417/278, 292, DIG. 1

[56] References Cited

U.S. PATENT DOCUMENTS

| 2,114,567 | 4/1938 | Mercur | 415/12 |
| 3,373,930 | 3/1968 | Rom | 415/12 X |
| 3,764,227 | 10/1973 | Albertzart | 415/12 X |

FOREIGN PATENT DOCUMENTS 1272645  5/1972  United Kingdom ................. 415/12

Primary Examiner—Mark O. Budd
Attorney, Agent, or Firm—Wenderoth, Lind & Ponack

[57] ABSTRACT

A vehicular generator with at least one cooling fan, wherein a plurality of blades of the cooling fan are made of a shape memorizing alloy, whereby, especially in medium and high revolution speed operations and low electric loads in which cooling air is not required, the blades are flattened, thereby preventing the rotational efficiency of the generator from falling and reducing noise ascribable to the cooling fan.

6 Claims, 8 Drawing Figures

VEHICULAR GENERATOR WITH COOLING FAN MADE OF RUBBER COVERED SHAPE MEMORIZING ALLOY

BACKGROUND OF THE INVENTION

This invention relates to improvements in a vehicular generator equipped with a cooling fan.

In general, a generator for use in a vehicle has its rotor driven by an engine. Usually, the rotor is driven at approximately double the rotational speed of the engine through a pulley. Since a cooling fan is fixed to the rotor, it is similarly rotated at approximately double the rotational speed of the engine. As will be stated below, this has caused disadvantages attributed to the cooling fan.

A prior-art device of this type is shown in FIG. 1 and FIGS. 2A and 2B. Referring to the figures, numeral 1 designates a stator, and numeral 2 designates a rotor positioned axially along the inner surface of the stator 1 leaving a minute air gap therebetween. First and second cooling fans 31 and 32 are fixed to the rotor 2 and include blades 311 and 321, respectively. A front bracket 4 supports the rotor 2 through a bearing, and is provided with a plurality of ventilating holes 41 and 42. A rear bracket 5 supports the rotor 2 through a bearing along with the front bracket 4, and is provided with a plurality of ventilating holes 51 and 52.

In operation, when the generator is driven by an engine, not shown in FIG. 1, the rotor 2 is rotated. The first and second cooling fans 31 and 32 mounted on the rotor 2 cause cooling air to flow from the ventilating holes 41 to holes 42 and from the ventilating holes 51 to holes 52, respectively. Thus, a cooling operation is effected.

In the prior-art device constructed and operated as described above, the cooling fans are rotated in proportion to the rotational speed of the engine irrespective of the level of the internal temperature of the generator. A large quantity of cooling air is accordingly circulated in the generator even where the temperature of the interior of the generator is low during the period of a low electric load during which much cooling air is not required. Especially at medium and high revolution speeds of the engine, the device has the disadvantages of increased power losses due to unnecessarily high speeds of the cooling fans, lower efficiency of the generator and increased noise of the cooling fans.

SUMMARY OF THE INVENTION

This invention has been made in order to eliminate the disadvantages as described above, and has for its object to provide an improved vehicular generator with cooling fans in which the blades of the cooling fans are flattened during the period of a low electric load, whereby the losses and noise of the cooling fans can be reduced especially at medium and high speeds.

In one aspect of performance of the present invention, there is provided a vehicular generator with at least one cooling fan having a plurality of blades, comprising a rotor which includes a field winding and to which said cooling fan is fixed, a stator which includes an armature winding, and front and rear side brackets which are snugly fitted on said stator and which support said rotor through bearings, at least a part of each blade in said plurality of blades of said cooling fan being made of a shape-memorizing alloy, so that only when the internal temperature of said generator has risen to a predetermined value, do said blades stand erect to execute a cooling operation.

BRIEF DESCRIPTION OF THE DRAWINGS

FIG. 2A is a front view of a cooling fan in the prior-art generator, while

FIG. 4A is a front view of a cooling fan in the generator of this invention, while

In the drawings, the same symbols indicate the same or corresponding parts.

DESCRIPTION OF THE PREFERRED EMBODIMENT

Figure 1:
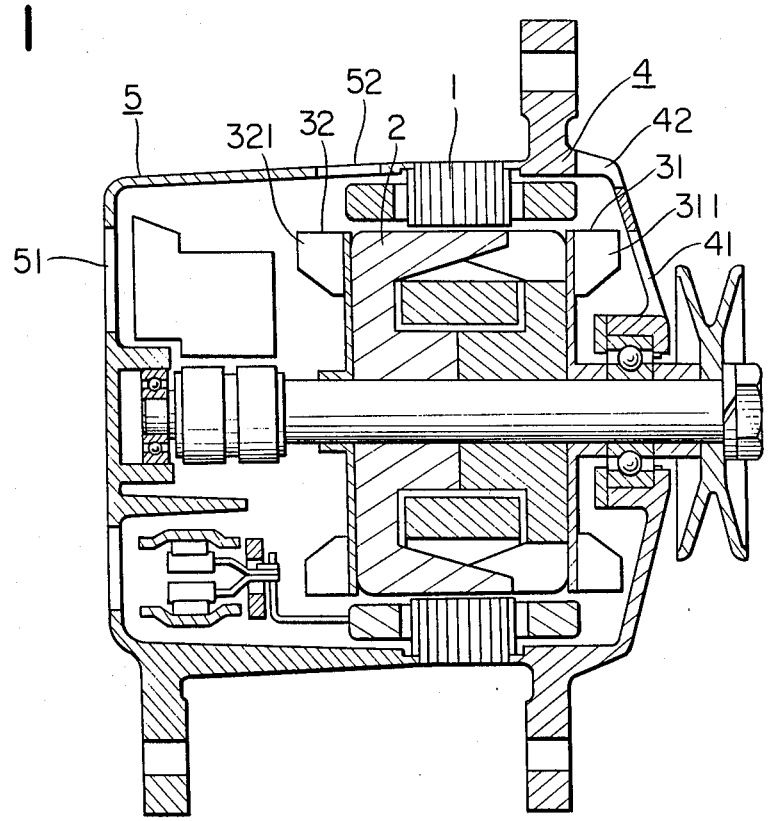
FIG. 1 is a transverse sectional view of a prior-art generator.
Figure 2A:
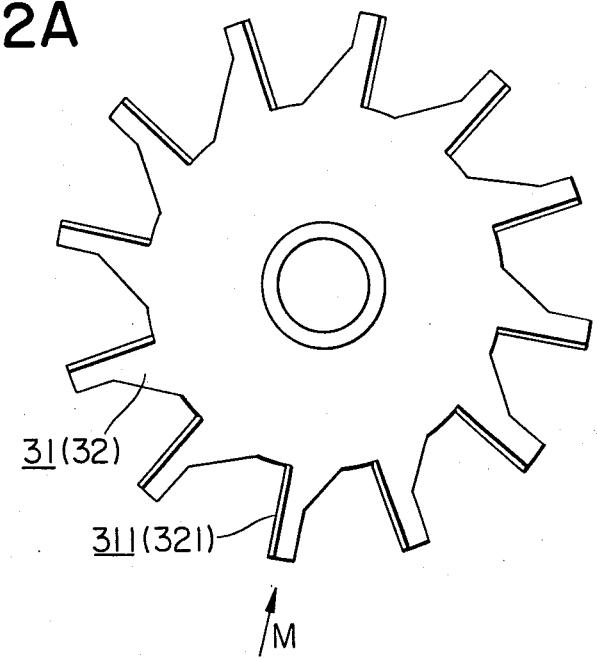
Figure 2B:
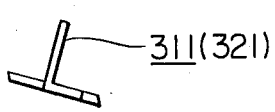
FIG. 2B is a partial view of the cooling fan seen in the direction of arrow M in FIG. 2A.
Figure 3:
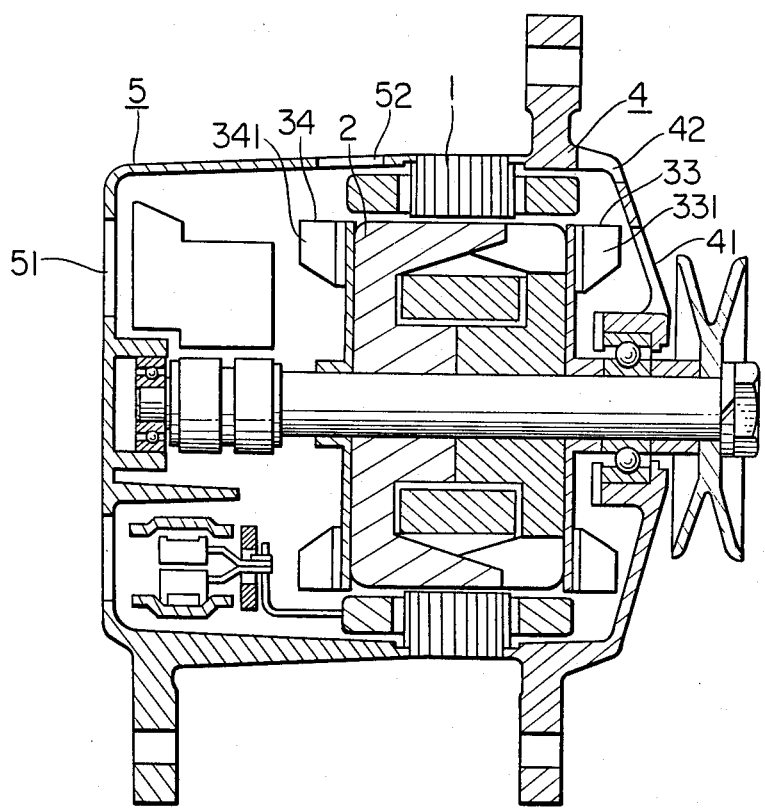
FIG. 3 is a transverse sectional view showing an embodiment of this invention.
Figure 5:
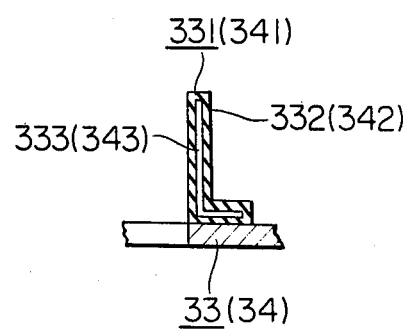
FIG. 5 is a sectional view taken along line V—V in FIG. 4A.
Figure 6:
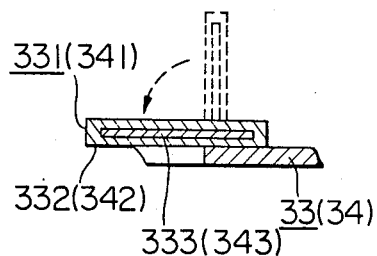
FIG. 6 is a diagrammatic view for explaining the operation of the blades which constitute the cooling fan.
Figure 4A:
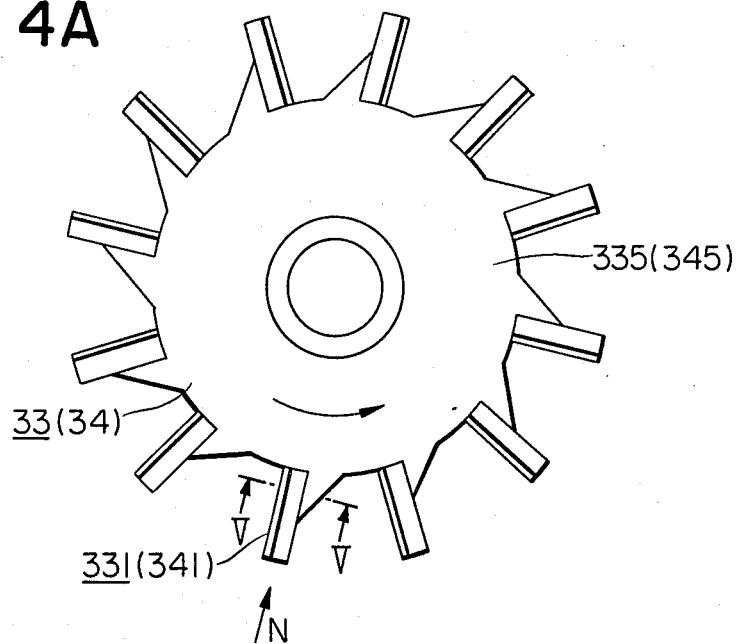
Figure 4B:
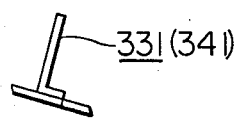
FIG. 4B is a partial view of the cooling fan seen in the direction of arrow N in FIG. 4A.

Now, an embodiment of this invention will be described with reference to the drawings. In FIG. 3 and FIGS. 4A and 4B, numerals 33 and 34 designate first and second cooling fans which are respectively fixed to both the axial ends of a rotor 2. As seen from the detailed views of FIGS. 4A and 4B, the cooling fans 33 and 34 are constructed of disc portions 335 and 345 to be mounted on the rotor 2, and a plurality of blades 331 and 341 radially extending from the respective disc portions, respectively. As shown in FIGS. 5 and 6, each of the blades 331 and 341 is constructed of a member 332 or 342 which is made of a soft, flexible resilient material, for example, rubber, and a member 333 or 343 which is made of a shape memorizing alloy and which is embedded in the soft material. As is well known, the shape memorizing alloy has the property that, even when it has been variously transformed, it returns to the original memorized shape when heated. An example of the shape memorizing alloy for use in the present invention has an L-shaped memory state. The remaining arrangement of the embodiment is the same as in the prior art, and will not be described again.

In explaining the operation of the embodiment, the blades 331 and 341 in FIGS. 5 and 6 will be first described. When the ambient temperature is high, the members 333 and 343 of the shape memorizing alloy are in the state in which the blades 331 and 341 stand erect, i.e. perpendicular to the plane of rotation of the rotor, as illustrated in FIG. 5. However, when the ambient temperature falls, the memorized state (position) of the blades causes the blades to be subject to deformation and they are subsequently flattened (made straight) due to the force of air on the blades 331 and 341 when the engine is turning so as to lie substantially in the plane of the rotor as illustrated in FIG. 6. Accordingly, when the generator is driven by the engine, the rotor 2 rotates, so that the first and second cooling fans 33 and 34 provided with the blades 331 and 341 having the characterizing feature as described above rotate simultaneously therewith. Initially, when starting the engine, the temperature in the generator is low, and hence, the blades 331 and 341 are flattened due to wind pressure on the blades as indicated by the solid lines in FIG. 6.

Thereafter, when the electric load of the generator has increased until the temperature in the generator has risen to a predetermined value, the members 333 and 343 of the shape memorizing alloy regain their memorized shape, namely they reach the state of FIG. 5 in which the blades 331 and 341 stand erect (upright), thereby overcoming the wind pressure thereon. Thus and the cooling fans 33, 34 execute the normal cooling operation, to reduce the temperature of the generator. Subsequently, when the electric load has decreased to cause the temperature of the interior of the generator to fall below the predetermined value, the sustaining forces of the shape memorizing alloy members 333 and 343 are lost, and the blades 331 and 341 are flattened by wind pressure as illustrated in FIG. 6. As thus far described, the blades 331 and 341 are upright or flattened depending upon the level of the temperature in the generator, whereby the airflow of ventilation can be adjusted.

While the embodiment employs the shape memorizing alloy members which transform the blades 331 and 341 into the shape of the letter L, a similar effect is achieved even when shape memorizing alloy members in the form of a spring are used or when the blades are entirely fabricated of the shape memorizing alloy members.

As set forth above, according to this invention, a shape memorizing alloy is employed for the blades of a cooling fan, and these blades are controlled depending upon temperature rise values in a generator, whereby, especially in medium and high revolution speed regions of the engine and low electric loads in which cooling air is not required, the blades of the cooling fan can be flattened, thereby reducing the ventilation loss of the cooling fan and the noise thereof.

What is claimed is:

1. A generator for a vehicle, comprising:
   a rotor having a field winding;
   at least one cooling fan having a plurality of blades fixed to said rotor;
   a stator having an armature winding and front and rear brackets snugly fitted on said stator, and bearings in said brackets supporting said rotor for rotation within said armature winding;
   at least a part of each blade of said plurality of blades of said cooling fan being made of a shape memorizing alloy covered with a soft, flexible, resilient material, said part of each blade, when the internal temperature of said generator has risen to a predetermined value, being at an angle to the plane of rotation of said rotor to cause a flow of air over said armature winding to perform a cooling action thereon.

2. A generator as claimed in claim 1 wherein said rotor is spaced from said stator along the inner surface of said stator to leave a minute air gap therebetween, and said front and rear brackets have ventilating holes therethrough.

3. A generator as claimed in claim 1 wherein the shape of said part of each blade made of the shape memorizing alloy when said alloy is at said predetermined temperature value is in the shape of the letter L with one leg perpendicular to the plane of rotation of said rotor.

4. A generator as claimed in claim 1 wherein said cooling fan is comprised of a disc portion which is mounted on said rotor and said plurality of blades extend radially from said disc portion.

5. A generator as claimed in claim 4 wherein there is a cooling fan at each of the opposite axial ends of said rotor.

6. A generator as claimed in claim 1 wherein said soft material is rubber.

* * * * *